US009869145B2

United States Patent
Jones et al.

(10) Patent No.: US 9,869,145 B2
(45) Date of Patent: Jan. 16, 2018

(54) ACTUATED ARM FOR USE WITH A SHAKER

(71) Applicant: M-I L.L.C., Houston, TX (US)

(72) Inventors: Bradley N. Jones, Crestview Hills, KY (US); Thomas Geehan, Houston, TX (US)

(73) Assignee: M-I L.L.C., Houston, TX (US)

( * ) Notice: Subject to any disclaimer, the term of this patent is extended or adjusted under 35 U.S.C. 154(b) by 902 days.

(21) Appl. No.: 13/678,810

(22) Filed: Nov. 16, 2012

(65) Prior Publication Data

US 2014/0138323 A1    May 22, 2014

(51) Int. Cl.

| | |
|---|---|
| B01D 35/00 | (2006.01) |
| B01D 35/14 | (2006.01) |
| B01D 33/70 | (2006.01) |
| B01D 33/44 | (2006.01) |
| B01D 35/20 | (2006.01) |
| E21B 21/06 | (2006.01) |
| B07B 1/46 | (2006.01) |
| B07B 1/55 | (2006.01) |
| B07B 13/16 | (2006.01) |
| B25J 11/00 | (2006.01) |
| B25J 15/00 | (2006.01) |
| B01D 24/38 | (2006.01) |
| B01D 41/04 | (2006.01) |
| B01D 33/00 | (2006.01) |
| C02F 1/00 | (2006.01) |

(Continued)

(52) U.S. Cl.
CPC ............. E21B 21/065 (2013.01); B07B 1/46 (2013.01); B07B 1/55 (2013.01); B07B 13/16 (2013.01); B25J 11/00 (2013.01); B25J 15/0019 (2013.01); B07B 1/40 (2013.01); B07B 1/4627 (2013.01); B07B 2201/04 (2013.01); Y10T 29/49721 (2015.01); Y10T 29/49769 (2015.01)

(58) Field of Classification Search
USPC ....................................................... 209/364
See application file for complete search history.

(56) References Cited

U.S. PATENT DOCUMENTS

| | | | | |
|---|---|---|---|---|
| 4,152,253 A | * | 5/1979 | Summers ........... | B01D 29/0075 209/17 |
| 5,010,412 A | * | 4/1991 | Garriss ................ | H04N 5/2256 348/371 |

(Continued)

FOREIGN PATENT DOCUMENTS

| | | | | |
|---|---|---|---|---|
| NO | WO 2006112728 A1 | * | 10/2006 | ........... B01D 33/033 |
| NO | WO 2010033039 A1 | * | 3/2010 | ........... B07B 1/4627 |

OTHER PUBLICATIONS

International Search Report and Written Opinion issued in corresponding International Application No. PCT/US2013/070109; dated Jan. 23, 2014 (11 pages).

*Primary Examiner* — Clare Perrin
(74) *Attorney, Agent, or Firm* — David Smith

(57) ABSTRACT

A system and method include a shaker configured to separate solids from a drilling fluid, the shaker having a screen assembly, and an actuated arm operatively coupled to the shaker, the actuated arm configured to interact with the screen assembly of the shaker. The actuated arm is configured to interact with the screen assembly of the shaker, with the actuated arm configured to remove, to inspect, to clean, to repair, or to replace the screen assembly of the shaker.

15 Claims, 7 Drawing Sheets

(51) Int. Cl.
*B07B 1/28* (2006.01)
*B07B 1/40* (2006.01)

(56) References Cited

U.S. PATENT DOCUMENTS

| | | | |
|---|---|---|---|
| 6,698,593 B1* | 3/2004 | Folke | B07B 1/46 209/319 |
| 2007/0163927 A1* | 7/2007 | Eia | B07B 1/46 209/378 |
| 2008/0078706 A1 | 4/2008 | Cady | |
| 2008/0251432 A1 | 10/2008 | Lilie et al. | |
| 2008/0283301 A1* | 11/2008 | Sherwood | E21B 21/01 175/206 |
| 2010/0276343 A1* | 11/2010 | Hukki | B07B 1/46 209/405 |
| 2011/0272332 A1 | 11/2011 | Chang | |
| 2012/0118798 A1 | 5/2012 | Scott et al. | |
| 2012/0222854 A1 | 9/2012 | McClung, III | |

\* cited by examiner

ACTUATED ARM FOR USE WITH A SHAKER

BACKGROUND ART

Vibratory separators are used today to remove solid particulate from fluid that may be passed through the separator. For example, in the oil and gas industry, vibratory separators, which are referred to as shale shakers, are used to remove cuttings and other solid particulate from drilling fluid. Oilfield drilling fluid, often called "mud," serves multiple purposes in the industry. Among its many functions, the drilling mud acts as a lubricant to cool rotary drill bits and facilitate faster cutting rates. Typically, the mud is mixed at the surface and pumped downhole at high pressure to the drill bit through a bore of the drill string. Once the mud reaches the drill bit, it exits through various nozzles and ports where it lubricates and cools the drill bit. After exiting through the nozzles, the "spent" fluid returns to the surface through an annulus formed between the drill string and the drilled wellbore. Much time and consideration is spent to ensure the mud mixture is optimal. Because the mud evaluation and mixture process is time consuming and expensive, drillers and service companies prefer to reclaim the returned drilling mud and recycle it for continued use.

Drilling mud is used to carry the cuttings away from the drill bit at the bottom of the borehole to the surface. As a drill bit pulverizes or scrapes the rock formation at the bottom of the borehole, small pieces of solid material are left behind. The drilling fluid exiting the nozzles at the bit acts to stir-up and carry the solid particles of rock and formation to the surface within the annulus between the drill string and the borehole. Therefore, the fluid exiting the borehole from the annulus is a slurry of formation cuttings in drilling mud. Before the mud can be recycled and re-pumped down through nozzles of the drill bit, the cutting particulates must be removed.

As such, a vibratory separator is a vibrating sieve-like table upon which returning solids laden drilling fluid is deposited and through which clean drilling fluid emerges. Typically, the vibratory separator is a table with a generally perforated filter screen bottom. Returning drilling fluid is deposited at the feed end of the vibratory separator. As the drilling fluid travels down the length of the vibrating table, the fluid falls through the perforations to a reservoir below, leaving the solid particulate material behind. The vibrating action of the vibratory separator table conveys solid particles left behind to a discharge end of the separator table.

The above described apparatus is illustrative of one type of shaker or vibratory separator known to those of ordinary skill in the art. The use of a shale shaker is particularly important in removing drilling solids from the drilling fluid. However, one or more shakers used to clean the drilling fluid require maintenance and upkeep, such as by inspecting, cleaning, or replacing the screens within the shakers, or by monitoring the shakers to determine if the shakers are operating at an efficient and desired rate. This maintenance of the shakers is time consuming, as an individual must individually monitor and maintain the shakers during operation. Further, when performing maintenance on the shakers, the drilling fluid must be redirected appropriately and the work must be performed in a time efficient manner, such as to prevent any other operations dependent on the shakers from having to delay for additional time more than necessary.

DETAILED DESCRIPTION

The following examples relate to embodiments of the disclosure. Although one or more of these embodiments may be preferred, the embodiments disclosed should not be interpreted, or otherwise used, as limiting the scope of the disclosure, including the claims. In addition, those having ordinary skill in the art will appreciate that the following description has broad application, and the discussion of any embodiment is meant only to be exemplary of that embodiment, and not intended to suggest that the scope of the disclosure, including the claims, is limited to that embodiment.

Certain terms are used throughout the following description and claims refer to particular features or components. As those having ordinary skill in the art will appreciate, different persons may refer to the same feature or component by different names. This document does not intend to distinguish between components or features that differ in name but not function. The figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first component is coupled to a second component, that connection may be through a direct connection, or through an indirect connection via other components, devices, and connections. Further, the terms "axial" and "axially" generally mean along or parallel to a central or longitudinal axis, while the terms "radial" and "radially" generally mean perpendicular to a central longitudinal axis. Additionally, directional terms, such as "above," "below," "upper," "lower," "horizontal," "vertical," "top," "bottom,"

etc., are used for convenience in referring to the accompanying drawings, and the terms are not meant to limit the disclosure.

Figure 1:
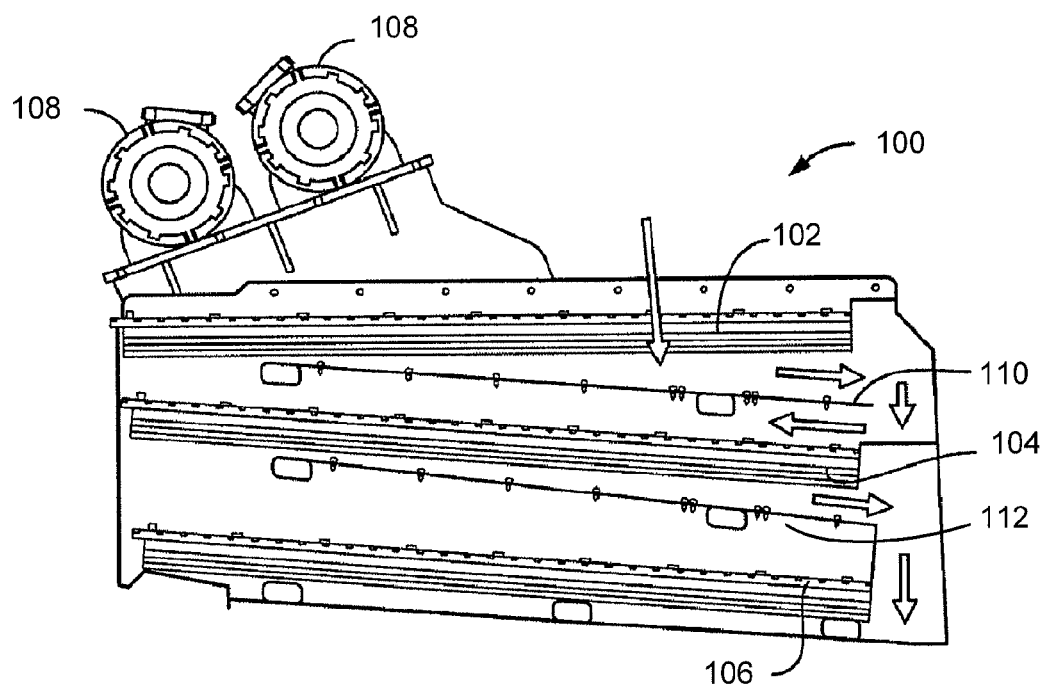
FIG. 1 shows a cross-sectional view of a shaker in accordance with one or more embodiments of the present disclosure.

Referring now to FIG. 1, a cross-sectional view of a shaker 100 in accordance with one or more embodiments of the present disclosure is shown. The shaker 100 may include one or more screening decks, such as by including a top screening deck 102, one or more middle screening decks 104, and a bottom screening deck 106, as shown. One or more motors 108 may also be attached to the shaker 100 to provide vibratory motion while separating solids from drilling fluid within the shaker 100.

A screen assembly (not shown), which may include or be formed from a mesh screen, may be provided on each of the screening decks 102, 104, and 106. As such, the screen assemblies may be used within the shaker 100 to filter out solids of various sizes from the drilling fluid according to the size of the respective mesh within the screen assembly. In one or more embodiments, the screen assembly may be formed as part of the screening decks 102, 104, and 106, or may be disposed on top of the screening decks 102, 104, and 106. Those of ordinary skill in the art will appreciate that the present disclosure is not limited to any particular screen assembly or mesh screen arrangement.

The shaker 100 may further include one or more flow-back pans, for example a top flow-back pan 110 and a bottom flow-back pan 112. The flow-back pans 110 and 112 may be used to distribute drilling fluid between the screening decks 102, 104, and 106 of the shaker 100. As shown, the shaker 100 may include the top flow-back pan 110 to distribute drilling fluid between the top screening deck 102 and the middle screening deck 104, and may include the bottom flow-back pan 112 to distribute drilling fluid between the middle screening deck 104 and the bottom screening deck 106.

Figure 2:
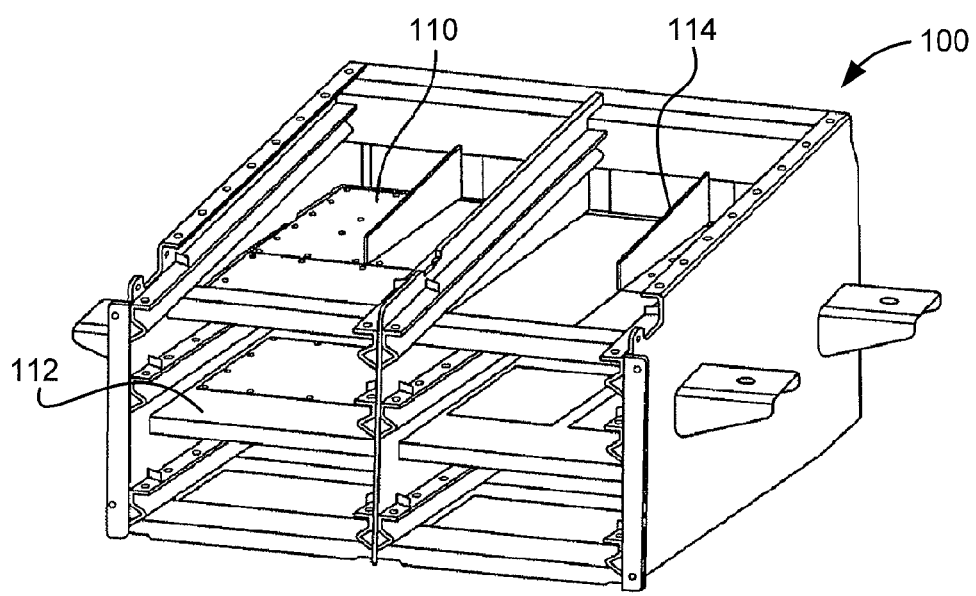
FIG. 2 shows a perspective assembly view of a shaker in accordance with one or more embodiments of the present disclosure.
Figure 3:
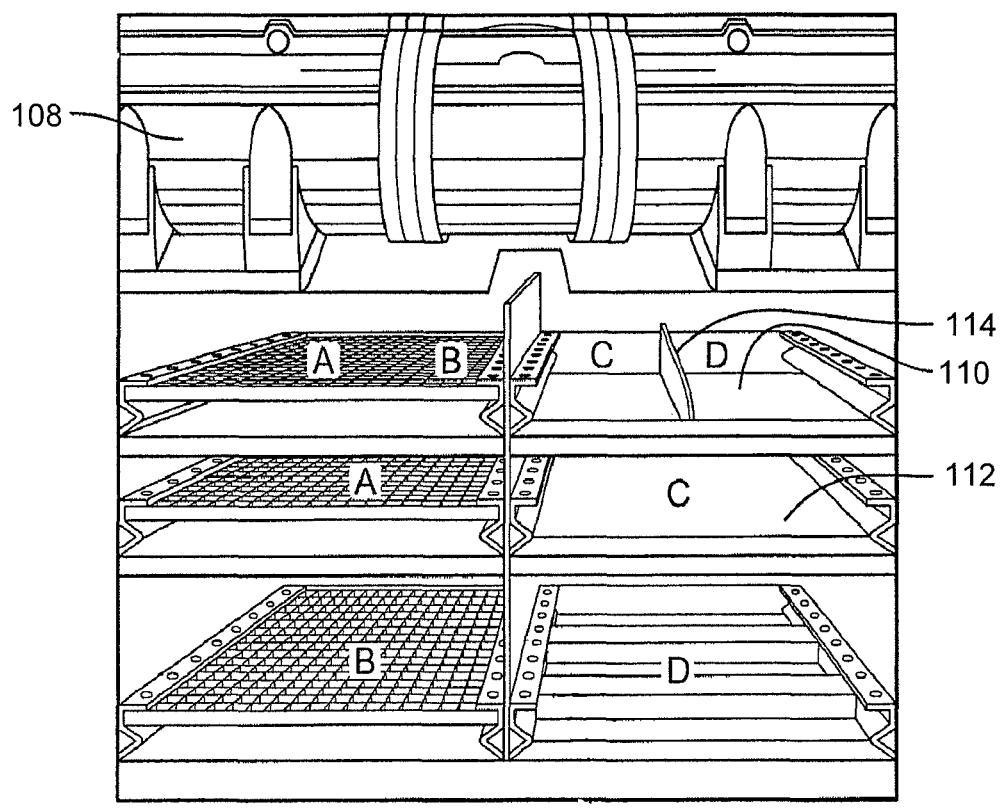
FIG. 3 shows a perspective view of a discharge end of a shaker in accordance with one or more embodiments of the present disclosure.

Referring now to FIGS. 2 and 3, multiple additional views of the shaker 100 in accordance with one or more embodiments of the present disclosure are shown. FIG. 2 provides a perspective assembly view of the shaker 100 in accordance with one or more embodiments of the present disclosure, and FIG. 3 provides a perspective view of a discharge end of the shaker 100 in accordance with one or more embodiments of the present disclosure. For illustration purposes, in FIG. 2, the screen assemblies are removed from the shaker 100 to provide a view of the top flow-back pan 110 and the bottom flow-back pan 112. However, those having ordinary skill in the art will appreciate that the arrangement and assembly of the flow-back pans may vary without departing from the scope of the present disclosure.

Referring to FIGS. 2 and 3, the top flow-back pan 110 may be disposed below the top screening deck and may include a plurality of channels for partitioning the flow of drilling fluid after initial separation of solids by the top screening deck. In this particular embodiment, four channels (A, B, C, D) are included in the top flow-back pan 110. The channels may be formed, for example, by providing a rib 114 between the adjacent channels. Referring to FIGS. 2 and 3, different configurations of the rib 114 are shown in accordance with embodiments of the present disclosure. As shown in FIG. 3, the rib 114 may extend along a full length of the top flow-back pan 110 and may be welded in place or secured with common fasteners. In alternate embodiments, such as in FIG. 2, the rib 114 may extend along only a portion of the entire length of the top flow-back pan 110, allowing drilling fluid to be more evenly distributed across the top flow-back pan 110 before being divided by the rib 114. In FIG. 2, the rib 114 may be welded onto a rear portion of the top flow-back pan 110.

Those of ordinary skill in the art will appreciate that the channels may be formed in several ways without departing from the scope of the present disclosure. For example, either a full length rib or a partial length rib may be used in both compartments, or a combination of full length ribs and short length ribs may be used, as shown. Further, in alternate embodiments, the flow-back pans may include upward bends between the channels to partition the channels from each other.

In one aspect, embodiments disclosed herein relate to a method, a system, and an apparatus that include an actuated arm operatively coupled to a shaker. As used herein, "operatively coupled" may be used herein to refer to having an actuated arm coupled with a shaker such that the actuated arm may operate with, interact with, and be used in conjunction with the shaker. In the present disclosure, an actuated arm may be operatively coupled to one or more shakers such that the actuated arm may be used for purposes of maintaining and interacting with the shaker, such as for removing, inspecting, cleaning, repairing, and/or replacing one or more screen assemblies for the one or more shakers. The actuated arm may be disposed adjacent or in proximity of the shaker, such as by disposing the actuated arm on a floor of a drilling rig with the shaker, disposing the actuated arm on a post in proximity of the shaker, connecting the actuated arm to a rail disposed above the shaker, or any other configuration or arrangement such that the actuated arm may operate and be used in conjunction with the shaker. As such, the actuated arm may include one or more actuators therein or operatively coupled thereto, such as to impart movement to the actuated arm. An actuator used in accordance with one or more embodiments disclosed herein may include an electrical, mechanical, hydraulic, pneumatic, and/or any other actuator known in the art, in which the actuator may be remotely controlled.

In accordance with one or more embodiments of the present disclosure, the actuated arm may include one or more members to engage the screen assembly, such as when removing and/or replacing the screen assembly of the shaker. The actuated arm may include a plurality of gripping members movable with respect to each other that are configured to grasp the screen assembly of the shaker, and/or may include an engagement member configured to engage a cavity formed within the screen assembly of the shaker. Further, the actuated arm may include one or more tools to facilitate removing, inspecting, cleaning, repairing, and/or replacing one or more screen assemblies for one or more shakers. For example, the actuated arm may include a camera configured to inspect the screen assembly of the shaker, may include a light source configured to emit light therefrom, may include a nozzle configured to emit a cleaning fluid therefrom, and/or may include a sampling device configured to sample the drilling fluid within the shaker. As such, the actuated arm may further include a sealant and/or a plug configured to repair the screen assembly therewith.

Figure 4A:
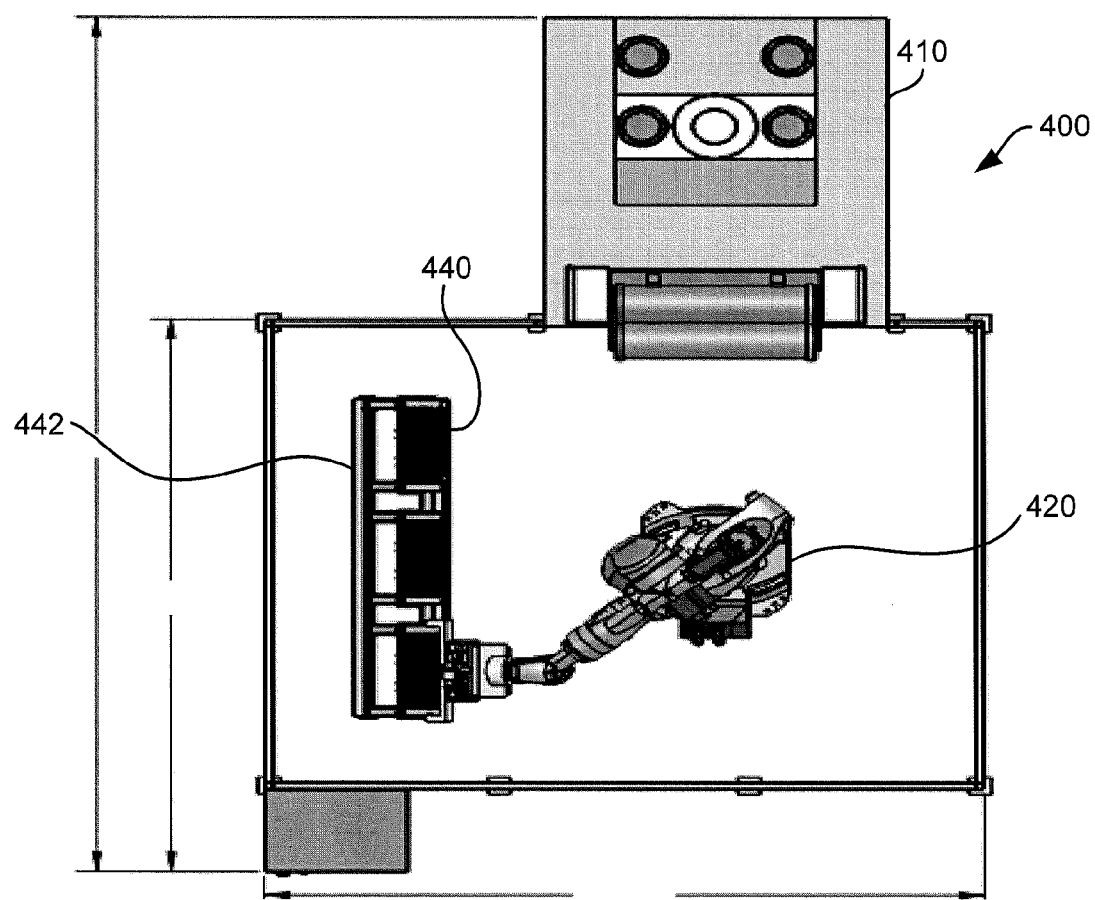
FIG. 4A shows a top view of a system to maintain a shaker in accordance with one or more embodiments of the present disclosure.
Figure 4B:
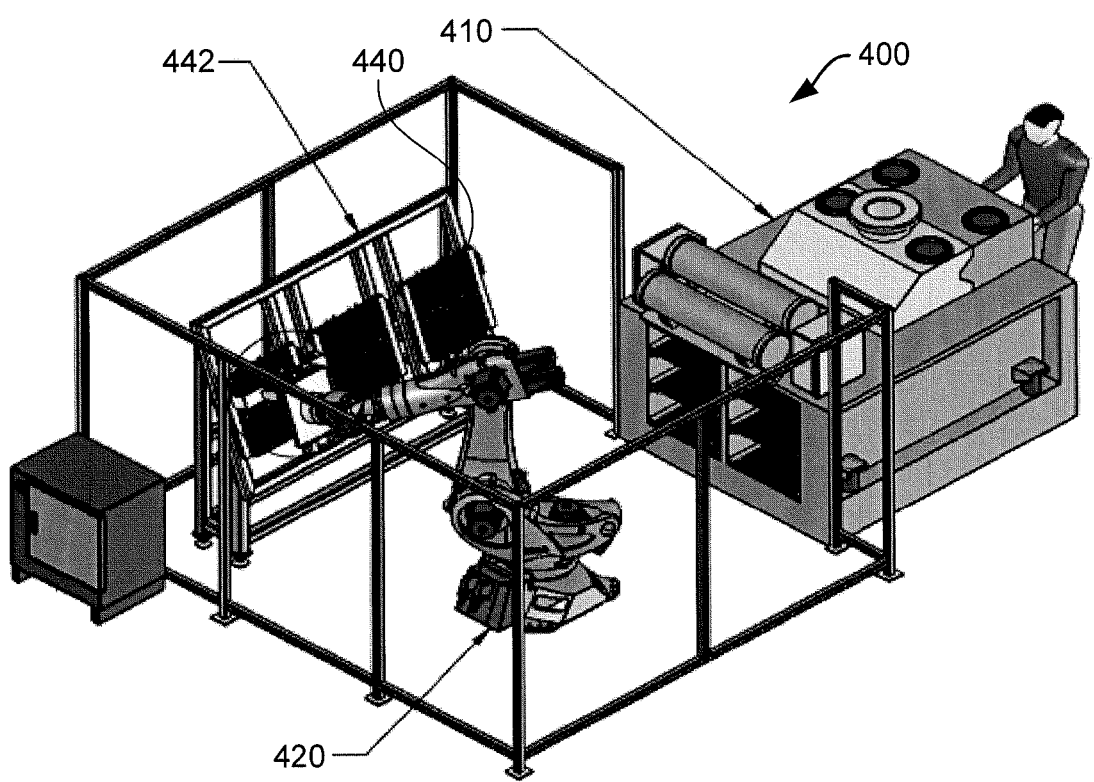
FIG. 4B shows a perspective view of a system to maintain a shaker in accordance with one or more embodiments of the present disclosure.

Referring now to FIGS. 4A and 4B, multiple perspective views of a system 400 to maintain a shaker 410 in accordance with one or more embodiments of the present disclosure are shown. Particularly, FIG. 4A provides a top view of the system 400 to maintain the shaker 410, and FIG. 4B provides a perspective view of the system 400 to maintain the shaker 410.

As shown, the system 400 to maintain the shaker 410 may include an actuator arm 420. The actuator arm 420 may be operatively coupled to the shaker 410, such that the actuator arm 420 may operate and be used in conjunction with the shaker 410. The actuator arm 420 may be used to maintain the shaker 410, such as by having the actuated arm 420 remove, inspect, clean, repair, and/or replace a screen assembly for the shaker 410. As discussed above, the shaker 410 may include one or more screening decks, such as a top screening deck, at least one middle screening deck, and a bottom screening deck. Each screening deck may then include a corresponding screen assembly to filter out solids of various sizes from drilling fluid introduced into the shaker 410 according to the size of the respective mesh within the screen assembly. As such, the actuator arm 420 may be used to maintain one or more of the screen assemblies of the shaker 410.

Further, in FIGS. 4A and 4B, the system 400 is shown having a single shaker 410. Those having ordinary skill in the art will appreciate, however, that a system of the present disclosure is not so limited, as the present disclosure contemplates the system having one or more shakers, such as by including four or five shakers within the system. In such embodiments, the actuator arm may be operatively coupled to each of the shakers included within the system, in which the actuated arm may remove, inspect, clean, repair, and/or replace one or more screen assemblies for the one or more shakers of the system.

The actuated arm 420 may be disposed adjacent or in proximity of the shaker 410, such as by having the actuated arm 420 disposed on a floor of a drilling rig with the shaker 410. Alternatively, the actuator arm 420 may be disposed on a post in proximity of the shaker 410. Further, the actuated arm 420 may be connected to a rail disposed above the shaker 410. For example, in an embodiment in which the system 400 includes one shaker 410, or more than one shaker 410, the actuated arm 420 may be connected to a rail disposed above the shakers 410, such that the actuated arm 420 may move upon the rail when used to maintain the shakers 410. Those having ordinary skill in the art will appreciate that other configurations or arrangements may be used as well within a system of the present disclosure to have an actuated arm operatively coupled to one or more shakers without departing from the scope of the present disclosure.

Referring still to FIGS. 4A and 4B, the system 400 may include one or more replacement screen assemblies 440, such as by having the one or more replacement screen assemblies 440 disposed adjacent to or in proximity of the actuated arm 420 and/or the shaker 410. As discussed above, as the actuated arm 420 may be used to maintain the shaker 410, the actuated arm 420 may be used to remove one or more screen assemblies of the shaker 410, and replace the removed one or more screen assemblies with the replacement screen assemblies 440.

As shown in FIGS. 4A and 4B, the replacement screen assemblies 440 may be disposed on a rack 442 disposed adjacent and in proximity of the actuated arm 420 and the shaker 410 within the system 400. The actuated arm 420 may remove the replacement screen assemblies 440 from the rack 442, as necessary, when replacing the screen assemblies of the shaker 410. The screen assemblies removed from the shaker 410 may then be moved and stored on the rack 442, and/or may otherwise be stored or discarded. Those having ordinary skill in the art will appreciate that though a rack is shown for storing replacement screen assemblies, the present disclosure is not so limited, as other arrangement or configurations may be used within a system of the present disclosure such that the replacement screen assemblies are available for use within the system.

Figure 5A:
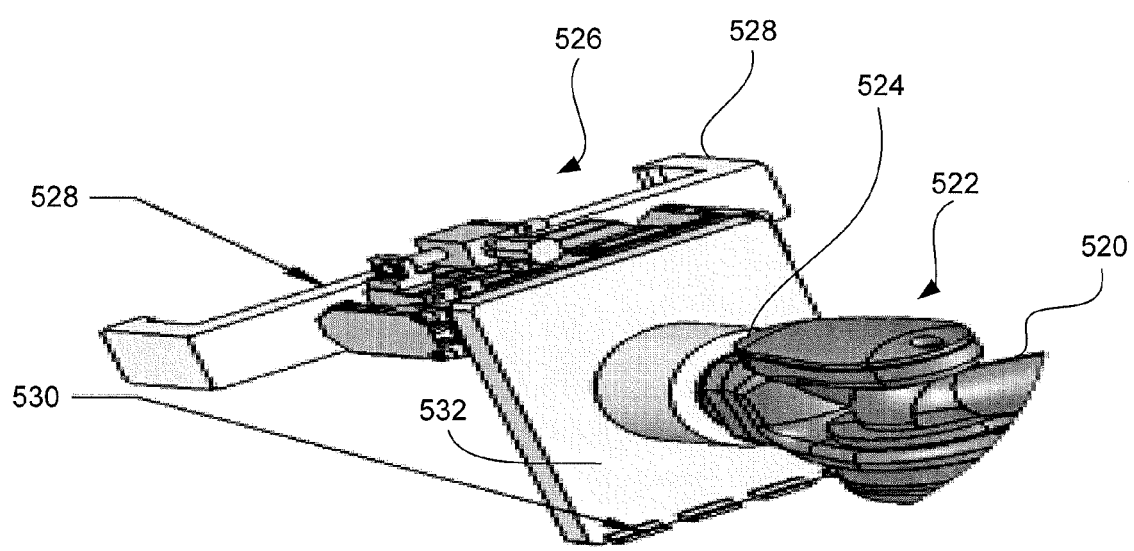
FIG. 5A shows a perspective view of an end of an actuated arm in accordance with one or more embodiments of the present disclosure.
Figure 5B:
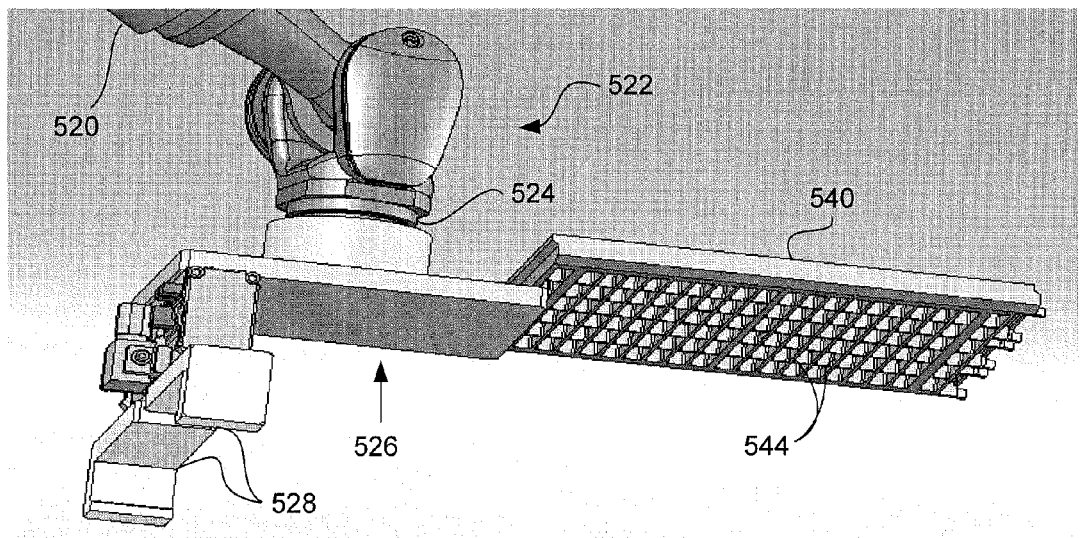
FIG. 5B shows a bottom perspective view of an end of an actuated arm engaged with a screen assembly in accordance with one or more embodiments of the present disclosure.
Figure 5C:
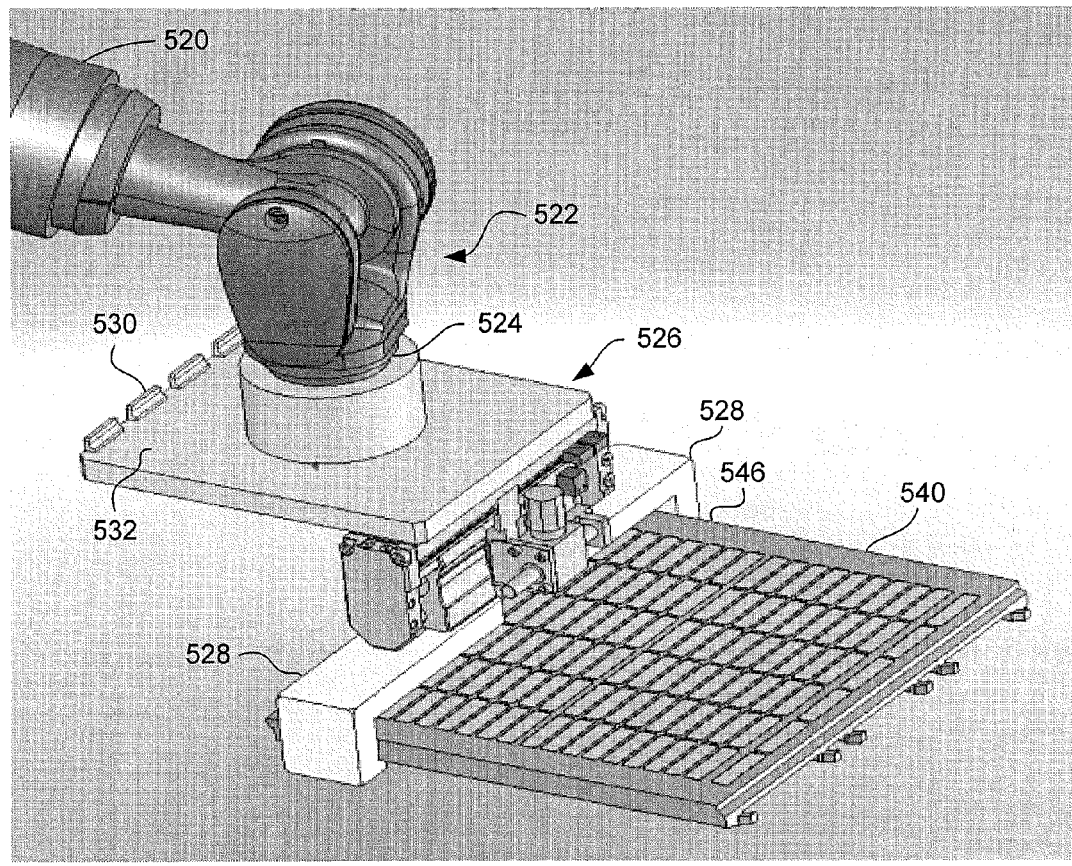
FIG. 5C shows a top perspective view of an end of an actuated arm engaged with a screen assembly in accordance with one or more embodiments of the present disclosure.

In accordance with one or more embodiments of the present disclosure, the actuated arm may include one or more members to engage the screen assembly, such as when removing and/or replacing the screen assembly of the shaker. Further, the actuated arm may include one or more tools to facilitate maintenance of the shaker, such as by removing, inspecting, cleaning, repairing, and/or replacing one or more screen assemblies for one or more shakers. Accordingly, referring now to FIGS. 5A, 5B, and 5C, multiple perspective views of an actuated arm 520 in accordance with one or more embodiments disclosed herein are shown. Particularly, FIG. 5A provides a perspective view of an end 522 of the actuated arm 520, FIG. 5B provides a bottom perspective view of the end 522 of the actuated arm 520 engaged with a screen assembly 540, and FIG. 5C provides a top perspective view of the end 522 of the actuated arm 520 engaged with the screen assembly 540.

The actuated arm 520 may include a connector 524, such as disposed at the end 522 of the actuated arm 520, for connecting one or more tools to the actuated arm 520. As shown in FIGS. 5A, 5B, and 5C, the connector 524 may be used to connect the actuated arm 520 to a tool 526 that may include one or more members for engaging the screen assembly 540. For example, as shown, the tool 526 may include a plurality of gripping members 528 that may be movable with respect to each other to grasp the screen assembly 540. In FIGS. 5A, 5B, and 5C, the tool 526 may include two gripping members 528 that may move with respect to each other, such as by having the gripping members 528 disposed opposite of each other to move towards and away from each other. However, those having ordinary skill in the art will appreciate that the present disclosure is not so limited, as any number of gripping members 528 may be used without departing from the present disclosure.

Further, the tool 526 may include one or more engagement members 530 to engage the screen assembly 540. For example, the screen assembly 540 may have one or more cavities 544 formed therein. The engagement members 530 may project from a surface of the tool 526, such as a top surface 532 of the tool 526. As such, the engagement members 530 may be fitted to be received within the cavities 544 to engage the cavities 544, thereby enabling the tool 526 to engage the screen assembly 540. Furthermore, as shown in FIGS. 5A, 5B, and 5C, the engagement members 530 may be disposed on an opposite side of the tool 526 with respect to the gripping members 528.

In accordance with one or more embodiments of the present disclosure, when an actuated arm is used to remove a screen assembly from a shaker, such as for cleaning, repair, or replacement, one or more engagement members of a tool of the actuated arm may be used to remove the screen assembly from the shaker. For example, the engagement members 530 (shown particularly in FIGS. 5A and 5C) may be received within the cavities 544 formed within the screen assembly 540, as shown in FIG. 5B, if the screen assembly 540 is being removed from a shaker. Further, in accordance with one or more embodiments of the present disclosure, when an actuated arm is used to insert a screen assembly within a shaker, such as when replacing or reinserting a screen assembly back within a shaker after removal, a plurality of gripping members of a tool of the actuated arm may be used to insert the screen assembly into the shaker. For example, as shown in FIG. 5C, the plurality of gripping members 528 may be used to grasp an exterior frame 546 of the screen assembly 540 if the screen assembly 540 is being inserted into a shaker.

As discussed above, an actuated arm in accordance with the present disclosure may be operatively coupled to a shaker to provide maintenance with the shaker. The actuated arm may include one or more actuators therein or operatively coupled thereto, such as to impart movement to the actuated arm. An actuator used in accordance with one or more embodiments disclosed herein may include an electrical, mechanical, hydraulic, pneumatic, and/or any other actuator known in the art, in which the actuator may be remotely controlled. Accordingly, in one embodiment, the actuated arm may include a pneumatic actuator, such as to actuate the gripping members 528 of the actuated arm 520 when engaging the screen assembly 540.

Further, the actuated arm may have a sensor and/or a controller coupled thereto and/or with each other, such as coupled to an actuator of the actuated arm. For example, the actuated arm may include a sensor to measure a position and/or orientation of the actuated arm, and/or may include a sensor that may be able to measure properties of the drilling fluid and/or surrounding environment (e.g., temperature, density, viscosity), and/or may include any other sensor known in the art. In such an embodiment, the sensor may be able to communicate the position of the actuated arm and the controller may be able to send signals to control the actuator, thereby enabling the actuator to move the actuated arm to a desired position or orientation. Those having ordinary skill in the art will appreciate that other arrangements for an actuator to move an actuated arm or a component thereof in accordance with embodiments disclosed herein may be used without departing from the scope of the present disclosure.

The actuated arm may include one or more members to engage the screen assembly, such as when removing and/or replacing the screen assembly of the shaker. However, as mentioned above, the actuated arm may include one or more additional tools to facilitate removing, inspecting, cleaning, repairing, and/or replacing one or more screen assemblies for one or more shakers. Accordingly, in one or more embodiments, an actuated arm may include a camera to inspect the screen assembly of a shaker, in addition to being able to inspect other aspects of the operation and maintenance of the shaker. Further, the actuated arm may include a light source to emit light therefrom, such as when inspecting a screen assembly or other aspects of the shaker.

The actuated arm may include a nozzle disposed thereon to emit a cleaning fluid therefrom, such as water or another cleaning fluid, to clean a screen assembly of a shaker. The actuated arm may include a sampling and/or measuring device to sample and/or take measurements of the drilling fluid within the shaker. Furthermore, the actuated arm may be used to repair a screen assembly, such as by having components accessible or included therewith to repair a screen assembly with. For example, the actuated arm may include a sealant and/or a plug, or may have access to the sealant and/or the plug. The actuated arm may then be used to repair the screen assembly, such as by applying the sealant and/or the plug to the screen assembly to the areas having tears and defects. Additionally, in accordance with one or more embodiments of the present disclosure, the actuated arm may include a rotating hand and/or a tool changer, in which the rotating hand or tool changer may be used to equip the actuated arm with multiple tools.

As discussed above, a system in accordance with the present disclosure may include an actuated arm configured to remove and replace a screen assembly from a shaker, such as for maintaining the shaker. However, the actuated arm may be used to inspect, clean, and repair a screen assembly from a shaker, in addition to inspecting, cleaning, and/or repairing other components and aspects of the shaker.

In accordance with one or more embodiments of the present disclosure, as an actuated arm may include a camera disposed thereon or included therewith, the camera may be able to facilitate a variety of functions when maintaining and inspecting the screen assembly, and the shaker altogether. Further, a light source may be provided with the actuated arm to emit light therefrom, such as when inspecting a screen assembly or other aspects of the shaker and otherwise facilitate use of the camera. For example, a camera of an actuated arm may be used to inspect a screen assembly, such as after a screen assembly has been removed from a shaker, or even while the screen assembly is in use within the shaker. The camera, which may be a high-definition camera, an infrared camera, and/or any other camera known in the art, may be used to inspect a screen assembly, such as by using techniques of image analysis, to determine if the screen assembly has any tears or defects, and if the tears or defects are significant enough to necessitate replacement of the screen assembly. In such an embodiment, if a screen assembly has tearing or defects above a certain amount or percentage, such as above 5% of the overall surface area of the screen assembly, the actuated arm may then be used to remove and replace the screen assembly, as compared to only cleaning and/or repairing the screen assembly.

Further, the camera may be used to facilitate maintaining and inspecting the shaker itself. For example, the camera may be used to inspect and observe the shaker when in use, such as by moving the camera toward the ends of the screening decks and screen assemblies to provide a view of the mesh of the screen assemblies and the load and dispersion of the drilling fluid within the shaker. Based upon these views and analysis, information may be gathered to determine a variety of functions of the shaker.

For example, based upon the distribution and load of the drilling fluid across the screen assemblies within the shaker, one or more parameters of the screen assemblies and the shaker may be adjusted to modify the distribution and load of the drilling fluid on the screen assemblies. For example, the tilt or angle of one or more of the screening decks and screen assemblies may be adjusted to prevent any drilling fluid flooding or to reduce the loading (depth of pool of drilling fluid) on the screening decks and screen assemblies. Another example may be adjusting the drilling fluid flow to the respective screening decks and the screen assemblies, such as to redistribute the drilling fluid loads across the screening decks and the screen assemblies, or increasing or decreasing the amount of drilling fluid provided to the shaker altogether. If an anomaly in the flow and/or loading of the drilling fluid is observed for one or more of the screen assemblies, the actuated arm may be used to inspect the screen assembly for any tears or defects which may cause such an anomaly. Further, the size of the mesh for one or more screen assemblies may be adjusted (e.g., by replacing the screen assembly) based on the degree of loading on the screen assemblies, such as by using a coarser mesh if the loading on a screen assembly is higher than expected, and using a finer mesh if the loading on a screen assembly is lower than expected.

Additionally, based upon the loading and distribution of drilling fluid, in addition to an inspection of the contents and mixture of the drilling fluid, the motion and vibration provided to the shaker may be adjusted. Adjusting the vibration shape of the shaker may be used to speed or slow the conveyance of the drilling fluid through the shaker to be better suited for the contents of the particular drilling fluid.

Furthermore, in an embodiment in which an actuated arm is used in conjunction with a plurality of shakers, as compared to only a single shaker, valves controlling the volume of drilling fluid provided to each of the plurality of shakers may be adjusted based upon observations of the distribution of the drilling fluid amongst the plurality of shakers.

In accordance with one or more embodiments of the present disclosure, as an actuated arm may include a nozzle disposed thereon or included therewith to emit a cleaning fluid therefrom, such as water or another cleaning fluid, the nozzle may be able to facilitate a variety of functions when maintaining and inspecting the screen assembly, and the shaker altogether. In one or more embodiments, the nozzle may be a high pressure nozzle, such as to facilitate cleaning when emitting a cleaning fluid therefrom. As such, a nozzle and use of a cleaning fluid may enable the actuated arm to clean and wash a screen assembly, such as such as after the screen assembly has been removed from a shaker, or even while the screen assembly is in use within the shaker. For example, the nozzle may be used to was the surface of the screen assembly to reduce blinding of the mesh of the screen assembly, such as from solids and particulate from the drilling fluid (e.g., sand) accumulating within the screen assembly. If removed from the shaker for cleaning, the screen assembly may be reused and reinserted into the shaker upon completion of inspection of the screen assembly.

A nozzle of an actuated arm may be used to clean edges of the screen assemblies and screening decks. For example, the nozzle of an actuated arm may be used to clean the interface of the screen assembly with the shaker, including the clamping and mounting hardware, to facilitate removal of the screen assemblies from the shaker. Further, the nozzle of the actuated arm may be used to clean the mounting tracks after the screen assemblies have been removed to facilitate installation and sealing when the screen assembly is being cleaned or replaced. Furthermore, the nozzle of the actuated arm may be used to substantially clean all outside surfaces of the screen assemblies that are removed from the shaker, such as before the actuated arm arranges the screen assemblies within storage racks.

In accordance with one or more embodiments of the present disclosure, an actuated arm may include a sampling and/or measuring device disposed thereon or included therewith. The sampling and/or measuring device may be able to facilitate a variety of functions when maintaining and inspecting a shaker. For example, an actuated arm may include a sampling and/or measuring device, such as a solids moisture analyzer, to provide information and data of the drilling fluid within the shaker. The information and data may be related to the drilling fluid and/or the particulate and solids removed and filtered from the drilling fluid. The information and data may be related to the particulate and solids size and/or content of the drilling fluid, such as to indicate an amount or percentage of content of water, oil, and dry components, in addition to the type of solids, included within the drilling fluid. For example, the information and data may be related to the type of solids drilled within the formation. Further, the information and data may be related to the distribution and flow of the drilling fluid, such as information related to the drilling fluid loads on the respective screen assemblies and screening decks.

As such, this information and data may indicate that the actuated arm may be used to remove, clean, inspect, and/or replace one or more screen assemblies of the shaker, and/or adjust motions, positions, and arrangements of the screen assemblies and screening decks within the shaker. In one or more embodiments, one or more algorithms may be developed to automate and optimize the process. For example, the actuated arm may automatically begin maintenance functions when a certain condition is met or not met, such as by having a moisture content of the drilling fluid above a certain predetermined amount. Thus, one having ordinary skill in the art will appreciate that a range of controls and measurements may be developed based upon desired inputs and performance for one or more shakers.

A sampling and/or measuring device for an actuated arm in accordance with the present disclosure may include a device to physically sample drilling fluid and/or solids that are included within the shaker, such as by including a device that retrieves a sample of drilling fluid and/or drilled solids that are emitted from the endpoint of a screen assembly and screening deck. A sampling and/or measuring device may include a device that utilizes techniques of image analysis, such as image analysis software, that may be based upon images output from a camera included with the actuated arm. Image analysis may be used to measure drilling fluid that may be flooding from the endpoint of a screen assembly and screening deck, to measure an amount and/or height of solids discharged within the shaker, to measure a speed of solids conveyed within the shaker, and/or to measure other aspects regarding the load of drilling fluid on any particular screen assembly and screening deck within the shaker.

Further, in accordance with one or more embodiments of the present disclosure, as an actuated arm may include materials and tools disposed thereon or included therewith for repair of screen assemblies and screening decks within a shaker. For example, an actuated arm may include a sealant and/or a plug, and/or may have access to the sealant and/or the plug, that may be used to repair a screen assembly with. An example of a sealant may include a ultra-violet sealant, in which the actuated arm may apply and cure the sealant upon a screen assembly as desired or necessary. An example of a plug may include an injection molded plug, in which the actuated arm may apply the plug within a screen assembly as desired or necessary.

An actuated arm in accordance with one or more embodiments of the present disclosure may include one or more devices, such as attached thereto or incorporated therein, to facilitate having the actuated arm interact with one or more shakers. For example, an actuated arm of the present disclosure may include a diagnostic device, such as to inspect and assist in diagnosing any problems associated with the screen assemblies and other components of a shaker, may include an engagement device, such as to engage screen assemblies and other components of a shaker, and may include a repairing device, such as to repair screen assemblies and other components of a shaker. Accordingly, an example of a diagnostic device may include a camera configured to inspect the screen assembly of the shaker, a light source configured to emit light therefrom, and/or a sampling and measuring device configured to sample and take measurements of the drilling fluid within the shaker. Further, an example of an engagement device may include a plurality of gripping members movable with respect to each other that are configured to grasp the screen assembly of the shaker, an engagement member configured to engage a cavity formed within the screen assembly of the shaker, and/or a nozzle configured to emit a cleaning fluid therefrom. Furthermore, an example of a repairing device may include a mechanism or instrument that may include or have access to a sealant and/or a plug, in which the repairing device may apply and cure the sealant upon a screen assembly, or may apply the plug within a screen assembly as desired or necessary.

Figure 6:
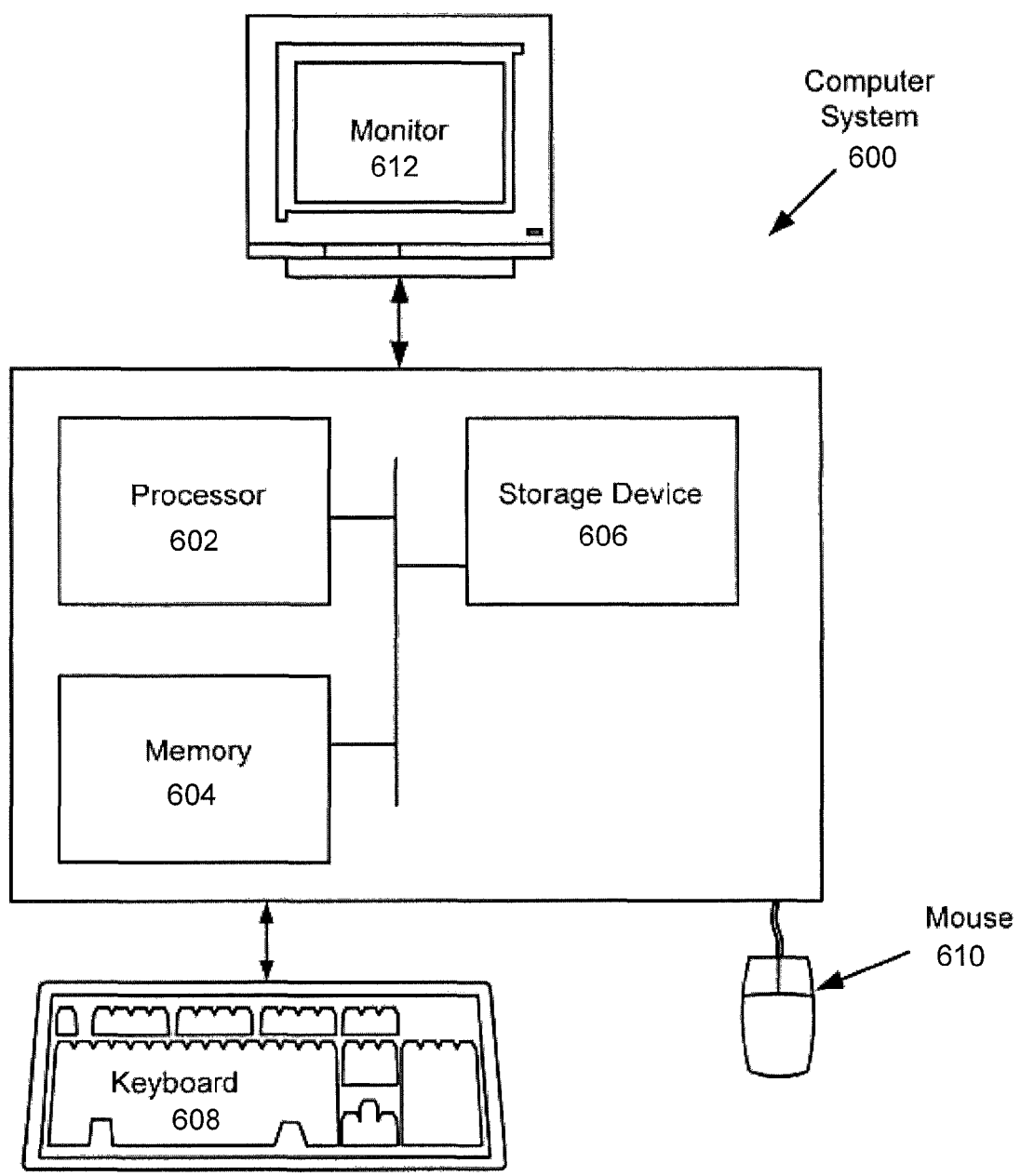
FIG. 6 shows a monitor and control system in accordance with one or more embodiments of the present disclosure.

One or more embodiments of a system that includes and operatively couples an actuated arm with one or more shakers may be implemented on any type of computer system, including, for example, a control system. For example, as shown in FIG. 6, a computer system 600 may include a processor 602, associated memory 604, a storage device 606, and numerous other elements and functionalities typical of today's computers (not shown). The memory 604 may include instructions for causing the computer system 600 to observe and/or control processes for an actuated arm and/or one or more shakers in accordance with one or more embodiments of the present disclosure.

The computer system 600 may also include input means, such as a keyboard 608 and a mouse 610, and output means, such as a monitor 612. The computer system 600 may be connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the computer system 600 may be located at a remote location and connected to the other elements over a network. One or more embodiments may be implemented on a distributed system having a plurality of nodes, where portions of the present disclosure may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform embodiments of the present disclosure may be stored on a tangible computer readable medium such as a digital video disc (DVD), compact disc (CD), a diskette, a tape, or any other suitable tangible computer-readable storage device.

Those having ordinary skill in the art will appreciate that the present disclosure contemplates other arrangements and configurations for a system including an actuated arm and one or more shakers without departing from the scope of the present disclosure. In addition to the tools and functionalities described above for the actuated arm and the system altogether, one or more sensors and meters may be included within the system to provide additional information and data to the system. For example, a flow meter may be included within a header box of a shaker, thereby indicating if and how much flow is provided to the shaker. The shaker and the actuated arm may have functions that then correspond to this information and data, such as by having the actuated arm maintain the screen assemblies of the shaker after a certain amount of time has elapsed, a certain volume of fluid has passed through the system, and/or a certain occurrence has taken place. For example, an actuated arm may be used to maintain the screen assemblies of a shaker regularly, such as once or twice a day, and/or may be used to maintain the screen assemblies after a certain amount of drilling fluid has passed through the shaker, and/or may be used to maintain the screen assemblies once a flow rate through a shaker is optimal and can be redirected to adjacent shakers. As such, in one or more embodiments, an actuated arm may be automated and autonomous, such as by using this information and data, when performing the various functions with the shaker.

The present disclosure may provide a system that may be used to maintain a shaker, such as by using an actuated arm to remove, clean, inspect, repair, and/or replace one or more screen assemblies within one or more shakers. For example, as discussed above, an actuated arm may be used to remove a screen assembly from a shaker, clean and inspect the screen assembly, and then either repair or replace the screen assembly based upon the condition of the screen assembly when inspected. Further, an actuated arm in accordance with the present disclosure may include one or more tools therewith for maintaining and inspecting the shaker itself. For example, as discussed above, the actuated arm may include a measuring and/or sampling device to determine the contents and the loads of the drilling fluid within the shaker, in which the shaker may be adjusted for optimization in accordance with the contents and loads of the drilling fluid. Furthermore, a system in accordance with the present disclosure may be automated and autonomous to maintain one or more shakers based upon, for example, predefined conditions, logic, and algorithms that may be used to implement predefined functions for the actuated arm and shaker within the system of the present disclosure.

In one aspect, embodiments disclosed herein relate to a system including a shaker configured to separate solids from a drilling fluid, the shaker having a screen assembly, and an actuated arm operatively coupled to the shaker, the actuated arm configured to interact with the screen assembly of the shaker.

In another aspect, embodiments disclosed herein relate to a method including actuating an actuated arm operatively coupled to a shaker, the shaker having a screen assembly, removing the screen assembly from the shaker using the actuated arm, and inspecting the screen assembly of the shaker using a camera of the actuated arm.

In another aspect, embodiments disclosed herein relate to a system including a plurality of shakers configured to separate solids from a drilling fluid, each of the plurality of shakers having a screen assembly, a plurality of replacement screen assemblies disposed in proximity of the plurality of shakers, and an actuated arm operatively coupled to the plurality of shakers, the actuated arm configured to replace the screen assembly from each of the plurality of shakers with one of the plurality of replacement screen assemblies. The actuated arm includes a diagnostic device configured to inspect each of the screen assemblies of the plurality of shakers, and an engagement device configured to engage with each of the screen assemblies of the plurality of shakers.

Although only a few example embodiments have been described in detail above those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A system comprising:
a shaker configured to separate solids from a drilling fluid, the shaker having a screen assembly located therein; and
an actuated arm operatively coupled to the shaker and located outside the shaker,
wherein the actuated arm is configured to interact with the screen assembly of the shaker by at least one selected from extending and retracting the actuated arm with respect to the shaker,
wherein an end of the actuated arm is movable to a position with respect to the screen assembly such that the actuated arm is interactable with the screen assembly when the end of the actuated arm is located in the position with respect to the screen assembly, and
wherein the actuated arm further comprises at least one selected from:
a plurality of gripping members movable with respect to each other that are configured to grasp the screen assembly of the shaker;
an engagement member disposed on the end of the actuated arm configured to fit into a cavity formed within the screen assembly of the shaker;
a sampling and measuring device configured to sample and take measurements of the drilling fluid or solids within the shaker;
a sealant or a plug configured to repair the screen assembly therewith or wherein
the actuated arm is configured to replace the screen assembly of the shaker with a replacement screen assembly.

2. The system of claim 1, wherein the actuated arm configured to interact with the screen assembly of the shaker comprises the actuated arm configured to remove, to inspect, or to clean the screen assembly of the shaker.

3. The system of claim 1, wherein the actuated arm further comprises a camera configured to inspect the screen assembly of the shaker and a light source configured to emit light therefrom.

4. The system of claim 1, wherein the actuated arm further comprises a nozzle configured to emit a cleaning fluid therefrom.

5. The system of claim 1, wherein the shaker is disposed on a floor of a drilling rig, and wherein the actuated arm is disposed on the floor of the drilling rig or is connected to a rail disposed above the floor of the drilling rig.

6. The system of claim 1, further comprising:
a plurality of shakers, each shaker having a screen assembly; and
the actuated arm is configured to interact with each of the screen assemblies of each of the plurality of shakers.

7. The system of claim 1, wherein:
the screen assembly of the shaker comprises a first screen assembly, a second screen assembly, and a third screen assembly; and
the actuated arm is configured to interact with the first screen assembly, the second screen assembly, and the third screen assembly of the shaker.

8. The system of claim 1, wherein the actuated arm is electrically actuated, mechanically actuated, hydraulically actuated, or pneumatically actuated.

9. A method comprising:
actuating an actuated arm operatively coupled to a shaker and located outside the shaker, the shaker configured to separate solids from a drilling fluid and having a screen assembly;
removing the screen assembly from the shaker using the actuated arm, the actuated arm having an end that is movable to a position with respect to the screen assembly such that the actuated arm is interactable with the screen assembly when the end of the actuated arm is located in the position with respect to the screen assembly; and
inspecting the screen assembly of the shaker using a camera of the actuated arm,
wherein the actuated arm further comprises at least one selected from:
a plurality of gripping members movable with respect to each other that are configured to grasp the screen assembly of the shaker;
an engagement member disposed on the end of the actuated arm configured to fit into a cavity formed within the screen assembly of the shaker;
a sampling and measuring device configured to sample and take measurements of the drilling fluid or solids within the shaker;
a sealant or a plug configured to repair the screen assembly therewith or wherein
the actuated arm is configured to replace the screen assembly of the shaker with a replacement screen assembly.

10. The method of claim 9, wherein based upon the inspection of the screen assembly, the method further comprises one of:
cleaning the screen assembly of the shaker using cleaning fluid emitted from a nozzle of the actuated arm;
repairing the screen assembly of the shaker with the sealant or the plug using the actuated arm; and
replacing the screen assembly of the shaker with the replacement screen assembly using the actuated arm.

11. The method of claim 10, wherein inspecting the screen assembly of the shaker comprises:
determining if the screen assembly comprises defects above a predetermined amount;
repairing the screen assembly if the defects of the screen assembly are below the predetermined amount; and
replacing the screen assembly with the replacement screen assembly if the defects of the screen assembly are above the predetermined amount.

12. The method of claim 9, further comprising:
determining a drilling fluid load on the screen assembly using the actuated arm; and
adjusting a parameter of the shaker to modify the drilling fluid load on the screen assembly.

13. A system comprising:
a plurality of shakers configured to separate solids from a drilling fluid, each of the plurality of shakers having a screen assembly; and
a plurality of replacement screen assemblies disposed in proximity of the plurality of shakers; and
an actuated arm operatively coupled to the plurality of shakers, the actuated arm having an end that is movable to a position with respect to the screen assembly of each of the plurality of shakers such that the actuated arm is interactable with the screen assembly when the end of the actuated arm is located in the position with respect to the screen assembly, wherein the actuated arm further comprises at least one selected from:
- a plurality of gripping members movable with respect to each other that are configured to grasp the screen assembly of each of the plurality of shakers;
- an engagement member disposed on a movable end of the actuated arm configured to fit into a cavity formed within the screen assembly of each of the plurality of shakers;
- a sampling and measuring device configured to sample and take measurements of the drilling fluid or solids within each of the plurality of shakers;
- a sealant or a plug configured to repair the screen assembly of each of the plurality of shakers or wherein
the actuated arm is configured to replace the screen assembly of each of the plurality of shakers with at least one replacement screen assembly of the plurality of replacement screen assemblies.

14. The system of claim 13, wherein actuated arm further comprises a diagnostic device comprising
- a camera configured to inspect the screen assembly of each of the plurality of shakers and a light source configured to emit light therefrom; and
- wherein the actuated arm further comprises an engagement device comprising
- a nozzle configured to emit a cleaning fluid therefrom.

15. The system of claim 13, wherein the plurality of shakers are interconnected with each other such that, when the actuated arm is interacting with one of the plurality of shakers, the drilling fluid is redistributed amongst the remainder of the plurality of shakers.

* * * * *